United States Patent [19]

Elvin et al.

[11] Patent Number: 5,277,879

[45] Date of Patent: Jan. 11, 1994

[54] SULFIDER WITH REMOVABLE INJECTORS

[75] Inventors: Frank J. Elvin, Houston, Tex.; Lloyd K. Whittington, Ponchatoula, La.

[73] Assignee: Coastal Catalyst Technology, Inc., Houston, Tex.

[21] Appl. No.: 689,978

[22] Filed: Apr. 23, 1991

[51] Int. Cl.$^5$ .......................................... F27B 15/10
[52] U.S. Cl. .................... 422/143; 239/569; 239/600; 422/139; 422/146; 422/310
[58] Field of Search ............... 422/139, 140, 241, 310, 422/311, 296, 146, 143; 239/600, 568, 569; 251/148; 137/320

[56] References Cited

U.S. PATENT DOCUMENTS

| 222,029 | 11/1879 | Flynn | 137/320 |
|---|---|---|---|
| 742,403 | 10/1903 | Easter et al. | 137/320 |
| 2,567,959 | 9/1951 | Munday | 422/142 X |
| 2,877,790 | 3/1959 | Wilhelm et al. | 137/320 |
| 3,464,435 | 9/1969 | Lamb et al. | 137/320 |
| 3,661,558 | 5/1972 | Heath et al. | 422/139 X |
| 4,171,945 | 10/1979 | Lazenby | 431/7 X |
| 4,259,088 | 3/1981 | Moss | 422/142 X |
| 4,686,197 | 8/1987 | Elvin | 502/22 |
| 4,800,185 | 1/1989 | Elvin et al. | 502/26 |
| 4,806,512 | 2/1989 | Elvin | 502/65 |
| 4,824,814 | 4/1989 | Elvin et al. | 502/22 |
| 4,828,684 | 5/1989 | Elvin | 208/251 |

FOREIGN PATENT DOCUMENTS 1589566 5/1981 United Kingdom .

Primary Examiner—Robert J. Warden
Assistant Examiner—Amalia Santiago
Attorney, Agent, or Firm—Browning, Bushman, Anderson & Brookhart

[57] ABSTRACT

An improved sulfider is provided for receiving high temperature catalysts from the hydrocarbon cracking operation and subjecting the catalyst to a sulfur-containing gas. The sulfider unit includes a plurality of gas injector tubes each individually removable from the sulfider while gas is continually injected into the sulfider treatment chamber through other of the injection tubes. Each injector tube may extend through a lowermost end of the sulfider, and has a central tube axis arranged substantially vertically when the tube is mounted to the sulfider housing. Fluid output ports are provided in sidewalls of an upper portion of the tube, and the tubes may be continually operated for extended periods of time without significant plugging problems. A service valve and packing unit associated with each injector tube enable partial removal of the tube from the treatment chamber without leakage of hydrogen sulfide gas, followed by closing of the valve and complete removal of the tube and packing unit. During service or repair, flow of gas to one of the tubes may be terminated and that tube repaired and placed back in service while the sulfider remains operational, thereby substantially reducing the downtime of the sulfider.

15 Claims, 2 Drawing Sheets

FIG.1
FIG.3
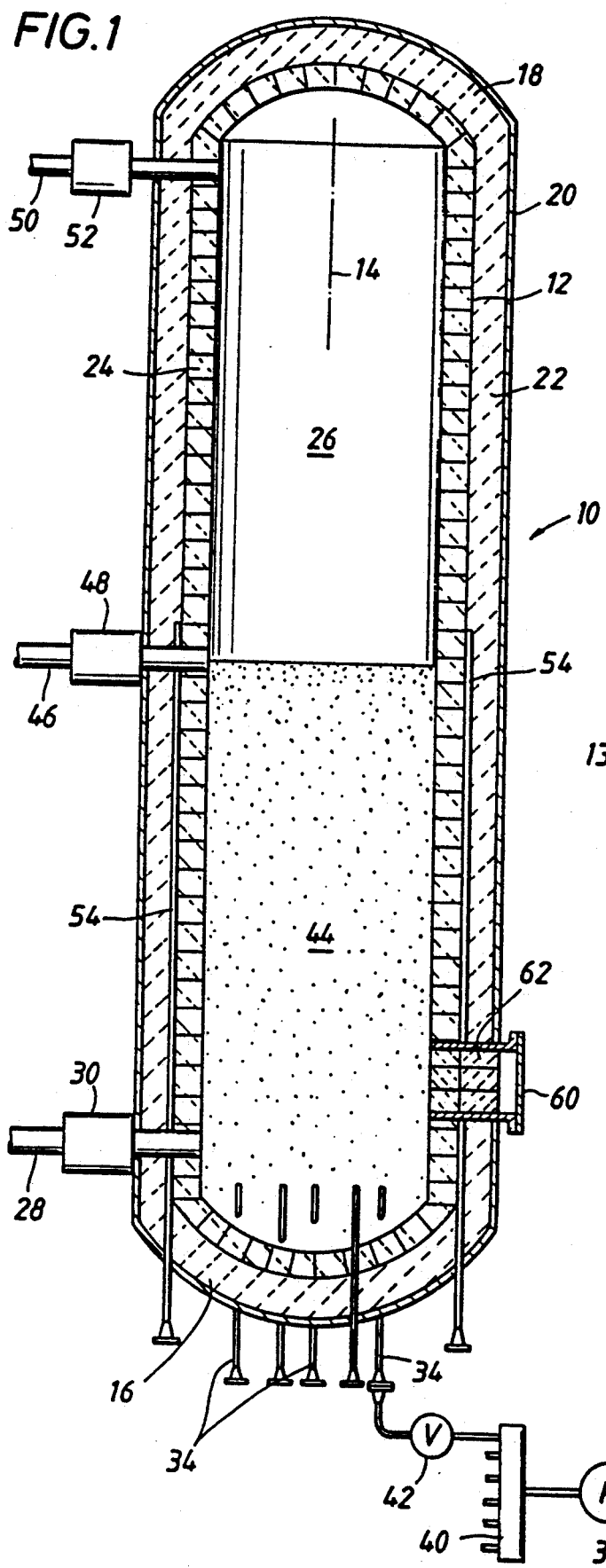
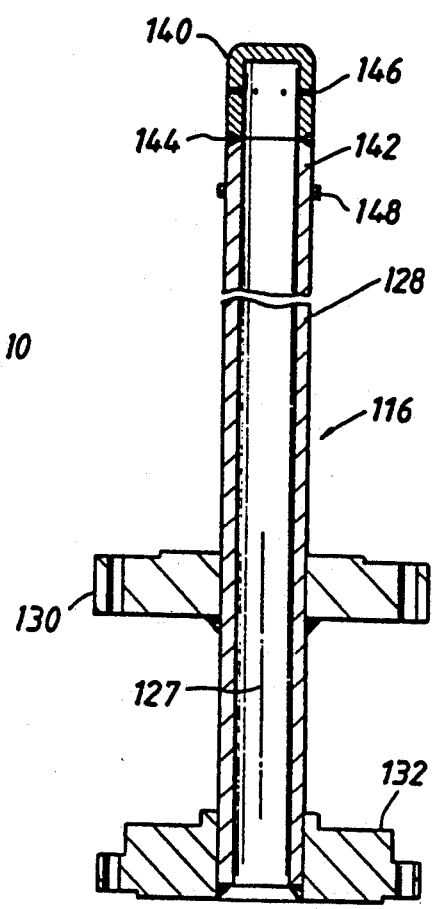

SULFIDER WITH REMOVABLE INJECTORS

FIELD OF INVENTION

The present invention relates to equipment and techniques for injecting gas into a treatment chamber. More particularly, this invention relates to sulfider equipment and techniques for injecting hydrogen sulfide vapor into a heated catalyst bed in a manner which substantially reduces the maintenance costs and the downtime for the sulfider.

BACKGROUND OF THE INVENTION

Various processes require that material be treated with an elemental sulfur-containing gas. This treatment process frequently involves a "bed" of material to be treated, with a sulfur-containing gas rising through the bed to treat the material. Material may be continually input to and removed from a chamber in a sulfider, and the treatment may occur at a high temperature provided by the incoming material. Sulfider equipment is thus well suited for a continuous flow-through process rather than a batch process. Fluid injector tubes have long been used to input the hydrogen-containing gas into the lower portion of the bed within the treatment chamber, while an upper portion of the sulfider acts as a settling chamber to allow treated material fines to settle by gravity back to the bed.

Those skilled in the cracking of hydrocarbon feedstock have long recognized the value of various solid catalyst to yield more valuable end products. These catalysts typically may be manufactured from various synthetic crystalline materials, and are utilized in powder form with particle sizes ranging from 1 to 100 microns. The solid catalyst become contaminated or poisoned by "metals" during the hydrocarbon conversion, with the term "metals" referring to contaminants in the form of either free metals or relatively non-volatile compounds. U.S. Pat. No. 3,140,253 and U.S. Pat. No. Re. 27,639 generally disclosed techniques for preparing a suitable catalyst for cracking hydrocarbon feedstocks.

Various techniques have been devised for removing metals from the hydrocarbon conversion catalyst so that the catalyst can be returned to service. One commonly used technique is to chlorinate a contaminated catalyst at elevated temperatures. According to the technique described in detail in U.S. Pat. No. 4,686,197, the contaminated catalyst is demetalized by contacting the catalyst with at least one chlorine-contaminating component. Vapor phase chlorination is preferred at a temperature of approximately 600° F., followed by an inert gas purge by approximately 1000° F. Chlorination can be effective to move vanadium from the catalyst, and also for placing nickel poisons into a form soluble in an aqueous solution. After chlorination and washing, the demetalized catalyst may then be returned to a fluid bed reactor vessel for cracking hydrocarbons.

As disclosed in the '197 patent, contaminated catalyst from the fluid bed catalytic cracking operation may be passed through an initial sulfiding process for enhancing the removal of nickel and vanadium during the subsequent chlorination and washing processes. During the sulfiding step, the poisoned catalyst is contacted with elemental sulfur vapors, such as $H_2S$, at a temperature of from 500° F. to 1500° F. According to the prior art, this sulfiding step is preferably performed using an in-line or continuous flow-through process by passing the heated catalyst into a sealed reactor having metal walls. $H_2S$ is introduced into the bottom of the reactor and passed upward through the fluid bed formed by the catalyst.

The injection tubes or nozzles in catalyst sulfiders have been of a conventional design for fluid bed reactions. A central injection pipe was passed through a lower end of the sulfider, and a plurality of tubes or nozzles extended horizontally outward from a header at the upper end of the pipe. The plurality of tubes thus resembled spokes which effectively covered the cross-sectional area of the sulfider with the injected gas. Each tube has a series of drilled ports in its lowermost surface, and the injected fluid was directed downwardly to increase its effectiveness at treating all of the material in the bed.

The hydrogen sulfide generator, the flow line from the generator to the injector tubes, and the injector tubes themselves produce scale or debris which tend to plug the ports of the injection tubes. When these ports plug, the material in the bed is not efficiently treated by the hydrogen sulfide. The sulfide accordingly must be shut down, the bed of catalyst removed, the ports in the injector tubes cleaned, and the catalyst bed again formed to allow continued treatment. It was not uncommon to operate a sulfider for approximately one month, then shut the sulfider down for a period of one week or more to clean or replace the injection tubes. Maintenance costs for the sulfider are thus high, and more importantly, extensive hydrocarbon cracking equipment must operate at the reduced efficiency while the sulfider is down, or extra sulfiders must be constructed to treat catalysts while the injector tubes of a sulfider are cleaned and the sulfider returned to service.

The disadvantages of the prior art are overcome by the present invention, and improved methods and apparatus are hereinafter disclosed for substantially minimizing repair and maintenance costs for injector tubes used to introduce a sulfur-containing gas into a bed of material to be treated. The techniques of the present invention are particularly well suited for reducing the maintenance and plugging problems of a sulfider used in hydrocarbon cracking operations to assist in demetalizing catalysts by subjecting the contaminated catalyst to the sulfur-containing gas.

SUMMARY OF THE INVENTION

According to the present invention, an improved flow-through sulfider is provided for treating contaminated catalysts from a catalytic hydrocarbon cracking operation. The insulated sulfider is provided with a lower catalyst input line and an upper catalyst output line. A bed of catalysts within the chamber of the sulfider and between the input and output lines is treated with a sulfur-containing gas to assist in demetalizing the catalyst. The sulfur-containing gas may be hydrogen sulfide, which is injected into the bed through a plurality of substantially vertical injector tubes each having ports adjacent an upper closed end of the tube.

The plurality of injection tubes may be supplied with hydrogen sulfide from a common source, and the gas preferably passed through a manifold exterior of the sulfider and then to each injection tube. An individual flow line and shutoff valve is provided between the manifold and each tube, such that the flow of hydrogen sulfide to any tube may be terminated while gas continues to be injected through other tubes. Gas flow to one or more of the tubes may thus be selectively terminated, and those tubes removed from the sulfider and repaired, cleaned or replaced while the sulfider remains operational. The spacing and number of tubes in the sulfider is thus selected so that efficient treatment can be obtained using less than all of the injection tubes. Substantial savings are realized by allowing the sulfider to remain operational while individual tubes are sequentially replaced.

Each injector tube may pass through and be sealed to the sulfider, with each tube being secured such that its central axis is substantially vertical. The upper end of the tube is preferably capped, although a plurality of drilled holes in the cap sidewalls allow hydrogen sulfide to escape to the fluid bed. The tubes may be uniformly arranged about the axis of the sulfider, and the holes in each tube may be spaced substantially above the lowermost surface of the sulfider chamber to allow scale to accumulate in the sulfider without contacting and plugging the holes. No substantial "dead space" in the bed occurs, and channeling of the hydrogen sulfide gas within the catalyst bed is minimal. A surprisingly effective hydrogen sulfide treatment of the contaminated catalyst thus occurs, even though the injection tubes are not horizontally positioned within the sulfider, and the injection port in the tubes are not directed downward.

It is an object of the present invention to provide an improved sulfider for treating contaminated catalysts from a hydrocarbon cracking operation with a sulfur-containing gas, and for enabling each of the plurality of gas injector tubes to be removed and replaced while gas is injected through other of the injection tubes and the sulfider remains operational.

It is a further object of the invention to provide improved injector tubes for injecting a sulfur-containing gas into a sulfider, such that the output ports of the tubes are arranged along each tube at a location where debris and scale will not accumulate.

It is a feature of the present invention to provide a manifold between a sulfur gas generator and a plurality of injection tubes, with a valve provided in the flow line between the manifold and each tube such that the flow of gas to any injection tube may be terminated and that tube removed from the sulfider and replaced while gas continues to be supplied to the sulfider through other of the injector tubes.

It is a further feature of the present invention to provide a sulfider with a plurality of injection tubes arranged uniformly about a central axis of the sulfider, with each injection tube being secured such that its central axis is substantially vertical and output ports are provided in the sides of the injector tubes.

It is an advantage of the present invention that the downtime of the sulfider due to injector plugging is substantially reduced, and accordingly the overall cost of servicing and operating the sulfider is reduced.

These and further objects, features, and advantages of the present invention will become apparent from the following detailed description, wherein reference is made to the figures in the accompanying drawings.

BRIEF DESCRIPTION OF THE DRAWINGS

FIG. 1 is a simplified cross-sectional view of a sulfider according to the present invention for treating contaminated catalysts from the hydrocarbon cracking operation.

FIG. 3 is a detailed cross-sectional view of one of the injector tubes generally shown in FIG. 2.

DETAILED DESCRIPTION OF PREFERRED EMBODIMENTS

Figure 2:
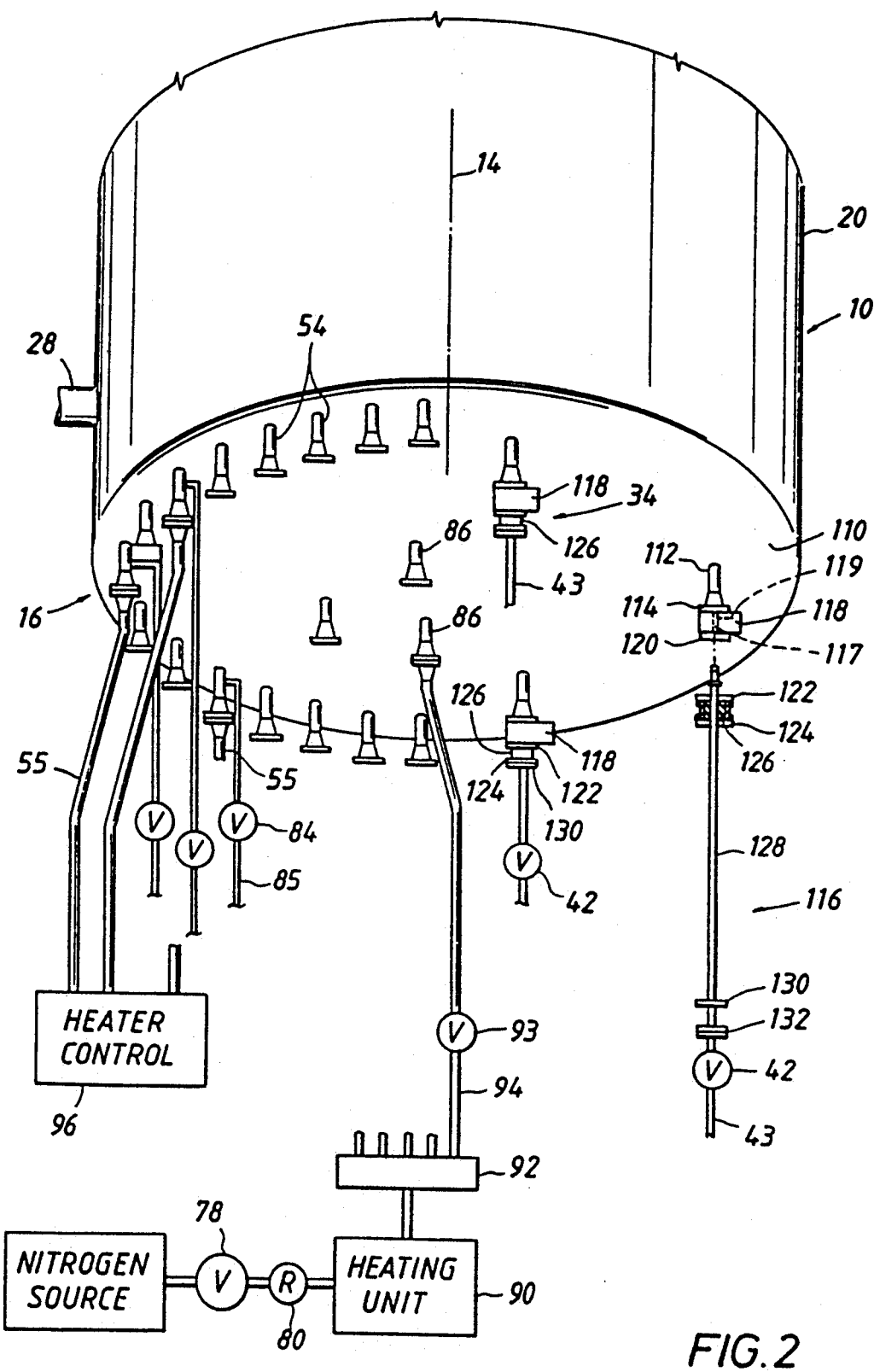
FIG. 2 is a lower pictorial view of the sulfider generally shown in FIG. 1, and illustrating the primary components for supplying heat to the sulfider and the lower portions of injector lines for inputting sulfur-containing gas to the injector tubes.

FIG. 1 discloses a suitable sulfider according to the present invention. The sulfider 10 may be part of a catalyst treatment facility of a catalytic hydrocarbon cracking plant, and is used for continually removing poisoned or contaminated catalyst from the cracking operation, and for returning demetalized catalyst back to the cracking operation. Sulfider 10 may be placed downstream from a nitrogen flushing unit and upstream from a chlorination unit. By contacting the poisoned catalyst with elemental sulfur vapors, such as $H_2S$ at approximately 1500° F., the metal compounds may be more easily converted to chloride form, and nickel and vanadium contaminants thereafter more easily removed during the subsequent chlorination and water washing steps. Further details with respect to the entire catalyst treatment system according to the present invention are disclosed in U.S. Pat. No. 4,686,197, hereby incorporated by reference.

Sulfider 10 comprises a generally tubular housing 12 having a vertical axis 14 and closed lower end 16 and a closed upper end 18. The housing 12 comprises an outer metal wall 20, a first outer refractory layer 22, a second inner refractory layer 24, and a plurality of heating units 54 circumferentially arranged along the interface between the refractory layers. The ends 16 and 18 have a construction similar to the walls of the sulfider, and accordingly the interior surface of the brick layer 24 defines a generally cylindrical treatment chamber 26. Although not shown in FIG. 1, the sulfider 10 may be mounted on a suitable base which allows for easy removal and maintenance of the $H_2S$ injection tubes and the heating rods discussed subsequently.

The poisoned catalysts at approximately 1550° F. continually enters the lower end of the sulfider via material input line 28, which is protected by insulation layer 30. Hydrogen sulfide from generation unit 32 is continually input into chamber 26 through a plurality of injector tubes 34 which pass through the lower end 16 of the sulfider. Main valve 36, regulator 38, manifold 40, and individual injector tube valves 42 control flow of $H_2S$ into the chamber 26, and thus maintain the chamber at a desired pressure of approximately 1 to 2 psi greater than atmospheric pressure. The layer or bed 44 of catalyst in chamber 26, particularly when subjected to pressurized $H_2S$ at the lower end of the bed, behaves substantially as a fluid at this elevated temperature, and continually flows out material output line 46 which is covered with insulation layer 48. The upper portion of the treatment chamber 26 above the bed 44 acts as a settling chamber to allow catalyst "fines" to settle by gravity back to the bed. A $H_2S$ pressure relief line 50 with conventional filter 52 prevents pressure in the chamber 26 from increasing over a selected limit, and provides a purge line for moving $H_2S$ from the chamber 26 prior to periodic sulfider maintenance operations.

During construction of the sulfider 10, elongate heating tubes 54 may be positioned circumferentially within the metal wall 20, and a sleeve (not shown) temporarily placed interior of the plurality of tubes 54, and a refractory layer 22 poured and cured in place. Once a layer 22 has cured, the interior refractory layer 24 may be formed. Although this layer may also be poured and cured in place, it is preferably to form this layer from refractory brick 58. A conventional personnel access 60 may be built into the unit 10 to allow repair and inspection personnel to pass to and from the chamber 26 during period maintenance, with one of the tubes being removable during this operation. Also, brick 62 may replace the poured refractory 22 for the area of the access 60, as shown in FIG. 1.

FIG. 2 depicts a lower portion of the sulfider as shown in FIG. 1. For the sake of clarity, the components of the heating system and the optional nitrogen injection system for the sulfider are illustrated only on the left side of centerline 14, although it should be understood that heaters 54 and nitrogen injectors 86 are preferably provided uniformly about the sulfider on both sides of centerline 14. Similarly, the hydrogen sulfide system is only illustrated on the right side of centerline 14 in FIG. 2, although as shown in FIG. 1, the injector tubes 34 are provided uniformly about the lower end 16 of the sulfider, and preferably are circumferentially arranged about the centerline 14.

FIG. 2 also depicts a plurality of electrically powered heating tubes 54, each of which are connected by conduit 55 to heater control 96. An annulus between a heater tube housing and an interior heating rod may be maintained under a slight positive inert gas pressure, and line 85 is provided for passing nitrogen to each of the heating tubes. Inert gas may also be injected into the chamber 26 from a plurality of nitrogen injectors 86. Nitrogen source 76 may thus supply gas to both injectors 86 and heating tubes 54. A main valve 78 and regulator 80 control flow of inert gas to heating unit 90, and manifold 92 includes a plurality of outlets for connection to a respective one of a lines 94 to the nitrogen injectors and lines 85 to the heating tubes. Valves 93 and 84 in the respective lines 94 and 85 allow gas flow to be both controlled to individual heaters and injectors, and allow for the maintenance of heaters 54 and injectors 86 while the unit remains operational. Although only exemplary conduits 55, lines 85 and lines 94 are shown in FIG. 2, it should be understood that lines 55 and lines 85 are provided for each of the heating tubes 54, and a line 94 is provided for each of the nitrogen injectors 86. Further details regarding the sulfider, and particularly the heating system and the refractory layers, are disclosed in a co-pending application Ser. No. 07/690,867 filed Aug. 23, 1991 and entitled REDUCED HEAT LOSS SULFIDER.

FIG. 2 depicts two hydrogen sulfide injectors 34 sealingly connected to the sulfider, while the injector on the right side is positioned for installation to the sulfider. The primary components of each hydrogen sulfider injector 34 are injector tube subassembly 116, a conventional gate valve, or end valve 118, and a packing or sealing gland 126. The installed injector tube subassembly passes through the packing gland 126 and valve 118, so that only flow line 43, control valve 42, valve 118 and packing gland 126 are visible. Each flow line 43 is connected to manifold 40, as shown in FIG. 1, so that hydrogen sulfide is supplied to each injector with the flow being controlled by valve 42 in each of the lines 43.

Gate valve 118 is provided with an upper flange 114 for removable connection of the valve to snub line 112, which in turn is weldably connected to the bottom metal plate 110 of the sulfider. A lower flange 120 of the gate valve is provided for conventional sealed connection to flange 122 of packing gland 126. End valve 118 is provided for service of the injector tube, as explained subsequently, and includes a central flow path 117 and a gate or closure member 119. A lower flange 124 on the packing gland is similarly intended for sealed connection to flange 130 which is welded on rod 128 of the injector tube subassembly 116. Flange 132 is welded to the lowermost end of rod 128, and during assembly is connected with a corresponding flange of control valve 42 in the flexible flow line 43. Conventional flange connection components, such as clamps or bolts, may be used for sealingly connecting the flanges, although the bolts themselves and the seals between the flanges are not shown.

FIG. 3 depicts in greater detail the injector tube subassembly 116 having tube 128 concentric with the axis 127, with the packing gland 126 removed from the tube 128 for clarity of the depicted components. Stop ring 148 is fixed to the upper end of tube 128 by any suitable means, such as a snap ring or welding, and flanges 130 and 132 are welded to the lower ends of the tube as discussed above. Prior to fixing both the ring and the flanges to the tube, the packing assembly 124 is slipped over the tube, so that the packing assembly 124 is slidable along the tube 128 but fixed between the ring 148 and flange 130. An inverted bowl-shaped cap 140 is welded at 144 to the upper end of tube 128, and may be fabricated from a different material than the tube 128. In an exemplary embodiment, the tube 128 is formed from A312 stainless steel pipe, while the cap 40 is formed from A403 stainless steel. Both the outer diameter and the inner diameter of the cap 140 preferably correspond approximately to the respective diameters of the tube 128 as shown. At least substantially the entire length of the tube, and at least preferably the portion between stop 148 and flange 130, has a substantially uniform diameter for reliable sealing engagement with the packing gland. The cap includes a plurality of substantially horizontal drilled holes 146 for passing hydrogen sulfide into the chamber 26 of the sulfider. The cap 140 thus closes off the flow of gas through the tube 128, except for the flow through the ports 146. Preferably from six to twelve drilled holes may be circumferentially arranged uniformly at substantially the same elevation within the subassembly 116, and each hole 146 typically has a diameter of from 1/32nd inch to ⅛th inch, and preferably about 1/16th inch.

With the sulfider 10 remaining operational and catalyst continually passing to and from the sulfider, any hydrogen sulfide injector tube 128 may be removed as follows. The valve 42 may be closed and sufficient hydrogen sulfide passed to the sulfider through the remaining injectors 34. Flange 130 may then be disconnected from flange 124, and tube 128 lowered until stop ring 148 engages the packing gland 126. During this operation, the packing gland remains sealed with the uniform outer diameter of the tube 128, so that hydrogen sulfide does not escape from the interior of the sulfider. At this stage, the valve 118 may be closed, with the gate of valve 118 located just above the top of cap 140. Once valve 118 is closed, the flange 122 may be disconnected from flange 120, and the tube 128 and packing gland removed as a unit from the operating sulfider. Ring 148 has the effect of reducing the likelihood that the operator will pull the tube 128 from the packing gland with the valve open, and assists in breaking the packing gland 126 free from the valve 118.

With the subassembly 116 and packing gland 126 removed, the ports 146 in the cap may be checked and cleaned. Also, the interior of the tube 128 may be cleaned by removing flange 132 from valve 42. If the tube 128 or cap 140 are significantly corroded, the necessary components may be replaced and the packing gland 126 re-installed between the ring 140 and the flange 130 as previously explained. During reassembly, the flange 122 may first be bolted to the flange 120, with the cap 140 again being just below the gate in the valve 118. The valve 118 may then be opened, and the tube 128 slid upward until the flange 130 may be bolted to the flange 124 on the packing gland. With the subassembly 116 installed, valve 42 may then be opened to continue passing hydrogen sulfide into the interior chamber of the sulfider.

A particular feature of the present invention is that the required number of hydrogen sulfide injector units are determined to pass a uniform layer of hydrogen sulfide through the catalyst bed, and then additional units are added during the design phase of the sulfider to allow the sulfider to remain operational while one or more injector units are checked and repaired. For example, if five injector units 34 are required to pass a uniform layer of hydrogen sulfide through the catalyst bed, seven or more injectors may be provided about the circumference of the sulfider, so that two or more sulfider injectors may be shut down for service (as long as they are not adjacent injectors) and the hydrogen sulfide flow through the remaining injectors will allow the sulfider to remain operational.

It is a further feature of the invention that the ports in each injector tube are not arranged in a lower surface of an injector tube where corrosion and debris will increase plugging. The prior art with respect to fluid bed injectors conventionally taught that ports should be directed downward to increase the desired upward uniform flow through the bed. While this arrangement may be preferred from a uniform gas flow standpoint, it has been determined that the advantage gained by such uniform flow is not worth the increased plugging problems which hydrogen sulfide injectors commonly encounter. No such downwardly facing port is possible if the injector tubes are vertical tubes as described herein. It has been determined that horizontal holes in the sides of the cap will provide sufficient dispersion of the hydrogen sulfide gas to create a uniform bed through the catalyst. It should also be understood that the present invention includes an embodiment wherein each of a plurality of hydrogen sulfide tubes pass substantially horizontally or at an inclination through the sides or bottom of the sulfider. For each of these cases, the feature of being able to servive one or more of the hydrogen sulfide injectors while the sulfider remains operational can be obtained by providing appropriate gate valves, packing glands, individual flow line valves and a manifold external of the metal housing 20 of the sulfider. Even for these embodiments, however, the ports need not be provided in a lower surface of the injector tubes. Drilled ports may rather be provided so that the ports project the hydrogen sulfide gas horizontally or at a slight downward inclination within the chamber 26 of the sulfider, rather than directly downward which was the conventional practice with prior art hydrogen sulfide injectors for fluid bed sulfiders. Even when the hydrogen sulfide gas is directed horizontally rather than downwardly, channeling of the gas through the catalyst bed is not a significant problem as long as a plurality of hydrogen sulfide injectors are provided, and each injector is provided with a plurality of exit ports 146, as explained herein.

The hydrogen sulfide unit 32 for supplying hydrogen sulfide gas to the injectors 34 may be satisfied from a tank car of bottled hydrogen sulfide gas. Hydrogen sulfide may also be provided for the injectors from the waste gas of a sulfur recovery unit for treating the feedstock for the hydrocarbon cracking facility. In this case, it may be expected that the sulfur containing gas may contain more debris than the situation where hydrogen sulfide is supplied from a bottled source, which further increases the benefits of the present invention for reducing operational costs while minimizing the downtime for the sulfider.

During normal operations when the injector tubes are not being serviced, each of the injector tubes is removably mounted to the sulfider treatment housing with the packing gland service valve serving as an intermediate connection member. The injector tube subassembly 116, packing gland 126 and associated service valve 118 could, however, each be separately mounted to the sulfider, with suitable seals provided between these components. By providing the manifold, the plurality of flow lines, and the corresponding plurality of control valves exterior of the housing, and by mounting the injector tubes as provided herein, individual injector tubes may be easily and reliably serviced while the sulfider remains operational.

It is a further feature of the present invention that the holes in the injector tubes be arranged at a level within the chamber 26 such that scale can accumulate in the lowermost portion of the chamber without closing about the ports 146. In a suitable embodiment of the present invention, ports 146 may be from six inches to twenty-four inches, and preferably from about twelve inches to eighteen inches, from the bottom of the chamber 26, so that a sizable quantity of scale may accumulate in the lowermost portion of the chamber before the sulfider will have to be shut down for service and removal of the scale. The scale is much more dense than the catalyst within the sulfider, and scale which accumulates over the ports 146 typically will not allow injected hydrogen sulfide gas to pass in a desired uniform manner through the ten to twelve foot bed of catalyst above the ports.

Individual heating rods may be removed and replaced while the sulfider remains operational, since the heating tube housing seals the heating rod from hydrogen sulfide gas within the chamber, and since the annulus between a heating rod and a heating tube housing is maintained under a positive inert pressure. Although plugging of the optional nitrogen injector tubes 86 is not a significant problem, such tubes may also be mounted to the sulfider housing with a gate valve and packing gland, as described herein, so that individual nitrogen tubes 86 may be serviced while the sulfider remains operational.

Various changes and modifications of the sulfider and sulfide injectors not described herein will be suggested from the foregoing description. Concepts of the present invention are particularly well suited for an improved sulfider to treat poisoned or contaminated catalyst, but may also be used for other high temperature fluid treatment operations wherein the treating fluid is corrosive or other deleterious to the material of the injectors, or where the injectors experience significant plugging problems. Such changes and modifications are considered to be within the scope of the present invention, which is defined by the following claims.

What is claimed is:

1. In a sulfider treatment unit comprising a housing having an interior chamber therein for receiving contaminated catalysts from a hydrocarbon cracking operation and forming a catalyst fluid bed for subjecting the catalyst to a sulfur-containing gas, the improvement comprising:
   a refractory layer interior of the housing for minimizing heat loss from the sulfider treatment unit;
   a catalyst input line for continually passing the catalyst into the chamber;
   a catalyst output line for continually withdrawing the treated catalyst from the chamber; and
   a plurality of sulfur-containing gas injector tubes each extending through the treatment unit housing and the refractory layer for passing the sulfur-containing gas into the chamber, each of the injector tubes included attachment means for individually removing each injector tube from the sulfider treatment unit housing while the sulfur-containing gas is passed into the chamber through other of the plurality of injector tubes;
   a manifold exterior of the sulfider treatment housing and having a plurality of outlet ports for distributing sulfur-containing gas to the plurality of injector tubes;
   a plurality of flow lines each interconnecting a respective manifold outlet port and a respective injector tube;
   a plurality of control valves each spaced along a respective flow line for controlling the hydrogen sulfide gas flow to a respective injector tube; and
   a plurality of service valves each sealingly secured to the sulfider treatment unit housing, each service valve having a flow path therein for removably receiving a respective gas injector tube and having a respective closure member for maintaining fluid communication between the flow path and the chamber when the closure member is opened and for sealing the flow path when the closure member is closed; and
   a plurality of sealing glands each surrounding a respective one of the plurality of injector tubes and each of said seal glands being removably secured to a respective service valve for sealing engagement with a respective injector tube while the tube is withdrawn through the flow path in a respective service valve.

2. The improvement as defined in claim 1, further comprising:
   each of the plurality of injector tubes having a gas receiving end and a substantially closed cap at an opposing end; and
   each of the plurality of injector tubes having a plurality of gas outlet ports adjacent the opposing end having the substantially closed end.

3. The improvement as defined in claim 1, wherein each of the plurality of injector tubes has a substantially uniform diameter along at least substantially its entire length for sealing engagement with a respective sealing gland while the injector tube is passed through a respective service valve.

4. The improvement as defined in claim 3, further comprising:
   each of the plurality of injector tubes having a stop member adjacent a substantially closed end of the injector tube for preventing the injector tube from passing through the respective sealing gland.

5. The improvement as defined in claim 1, further comprising:
   each of the plurality of injector tubes having a central tube axis;
   each of the plurality of injector tubes having a gas receiving end and a substantially closed opposing end; and
   each of the plurality of injector tubes having a plurality of gas outlet ports adjacent the closed end and which are circumferentially spaced within sidewalls of the injector tube and about the respective central tube axis.

6. The improvement as defined in claim 5, wherein each of the injector tubes is mounted to the housing such that the tube axis is substantially vertical.

7. In a sulfider treatment unit comprising a housing having an interior chamber therein for receiving contaminated catalyst from a hydrocarbon cracking operation and subjecting said catalyst to a sulfur-containing gas, the improvement comprising:
   a refractory layer interior of the housing for minimizing heat loss from the sulfider treatment unit;
   a catalyst input line for passing the high temperature catalyst into the chamber;
   a catalyst output line for withdrawing the treated catalyst from the chamber;
   a plurality of sulfur-containing gas injector tubes each extending through the treatment unit housing and the refractory layer for passing the sulfur-containing gas into the chamber, each of the injector tubes having a substantially uniform diameter along substantially its entire length and movable with respect to the housing;
   a plurality of sealing glands each surrounding a respective one of the plurality of injector tubes and each of said seal glands being removably secured to the housing for sealing engagement with the substantially uniform diameter of a respective injector tube when the tube is moved with respect to the housing; and
   each of the plurality of the injector tubes has a stop member fixed to an upper end of the injector tube for preventing the injector tube from passing through the respective sealing gland.

8. The improvement as defined in claim 7, further comprising:
   a plurality of service valves each sealingly secured to the sulfider treatment unit housing, each service valve having a flow path therein for removably receiving a respective injector tube, the flow path being in fluid communication with the chamber when the valve is open and sealing the chamber when the valve is closed.

9. The improvement as defined in claim 8, further comprising:
   each of the plurality of injector tubes having a gas receiving end and a substantially closed cap at an opposing upper end; and
   each of the plurality of injector tubes having a plurality of gas outlet ports adjacent the opposing end having the substantially closed cap.

10. In a sulfider treatment unit comprising a housing having an interior chamber therein for receiving contaminated catalysts from a hydrocarbon cracking operation and forming a catalyst fluid bed for subjecting the catalyst to hydrogen sulfide gas, the improvement comprising:

a plurality of heating units for maintaining a desired temperature within the interior chamber;

a refractory layer interior of the housing for minimizing heat loss from the sulfider treatment unit;

a catalyst input line for continually passing the catalyst into the chamber;

a catalyst output line above the catalyst input line for continually withdrawing the treated catalyst from the chamber;

a plurality of hydrogen sulfide gas injector tubes each extending through the treatment unit housing and the refractory layer for passing the hydrogen sulfide gas into the chamber and maintaining a pressure greater than atmospheric within the chamber, each of the injector tubes including withdrawal means for individually removing each injector tube from the sulfider treatment unit housing while the hydrogen sulfide gas is passed into the chamber through other of the plurality of injector tubes;

a plurality of service valves each sealingly secured to the sulfider treatment unit housing, each service valve having a flow path therein for removably receiving a respective gas injector tube and having a respective closure member for maintaining fluid communication between the flow path and the chamber when the closure member is opened and for sealing the flow path when the closure member is closed; and a plurality of sealing glands each surrounding a respective one of the plurality of injector tubes and each of said seal glands being removably secured to a respective service valve for sealing engagement with a respective injector tube while the tube is passes withdrawn through the flow path in a respective service valve.

11. The improvement as defined in claim 10, further comprising:

each of the plurality of injector tubes having a gas receiving end and a substantially closed cap at an opposing end;

each of the plurality of injector tubes having a plurality of gas outlet ports adjacent the opposing end; and each of the plurality of injector tubes having a stop member adjacent a substantially closed end of the injector tube for preventing the injector tube from passing through the respective sealing gland.

12. The improvement as defined in claim 11, wherein each of the plurality of injector tubes has a substantially uniform diameter along at least substantially its entire length for sealing engagement with a respective sealing gland while the injector tube is passed through a respective service valve.

13. The improvement as defined in claim 11, further comprising:

each of the plurality of injector tubes having a flange for removably mounting the injector tube to the sulfider treatment housing.

14. The improvement as defined in claim 10, further comprising:

a manifold exterior of the sulfider treatment housing and having a plurality of outlet ports for distributing the hydrogen sulfide gas to the plurality of injector tubes;

a plurality of flow lines each interconnecting a respective manifold outlet port and a respective injector tube; and a plurality of control valves each spaced along a respective flow line for controlling the hydrogen sulfide gas flow to a respective injector tube.

15. The improvement as defined in claim 10, further comprising:

each of the plurality of injector tubes having a substantially vertical tube axis;

each of the plurality of injector tubes having a gas receiving end and a substantially closed opposing end; and each of the plurality of injector tubes having a plurality of gas outlet ports adjacent the closed end and which are circumferentially spaced within sidewalls of the injector tube and about the respective substantially vertical tube axis.

* * * * *

UNITED STATES PATENT AND TRADEMARK OFFICE
CERTIFICATE OF CORRECTION

PATENT NO. : 5,277,879
DATED : January 11, 1994
INVENTOR(S) : Frank J. Elvin and Lloyd K. Whittington It is certified that error appears in the above-indentified patent and that said Letters Patent is hereby corrected as shown below:

In Col. 11, line 37, delete "passes".

Signed and Sealed this

Thirty-first Day of May, 1994

Attest:

BRUCE LEHMAN

Attesting Officer     Commissioner of Patents and Trademarks